(12) United States Patent
Li et al.

(10) Patent No.: US 11,335,352 B2
(45) Date of Patent: May 17, 2022

(54) VOICE IDENTITY FEATURE EXTRACTOR AND CLASSIFIER TRAINING

(71) Applicant: Tencent Technology (Shenzhen) Company Limited, Guangdong (CN)

(72) Inventors: Na Li, Guangdong (CN); Jun Wang, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 309 days.

(21) Appl. No.: 16/654,383

(22) Filed: Oct. 16, 2019

(65) Prior Publication Data

US 2020/0043504 A1    Feb. 6, 2020

Related U.S. Application Data

(63) Continuation of application No. PCT/CN2018/107385, filed on Sep. 25, 2018.

(30) Foreign Application Priority Data

Sep. 29, 2017   (CN) .................. 201710910880.X

(51) Int. Cl.
*G10L 17/04*        (2013.01)
*G06N 3/04*        (2006.01)
(Continued)

(52) U.S. Cl.
CPC ............ *G10L 17/04* (2013.01); *G06N 3/04* (2013.01); *G06N 3/08* (2013.01); *G10L 17/02* (2013.01); *G10L 17/18* (2013.01)

(58) Field of Classification Search
None
See application file for complete search history.

(56) References Cited

U.S. PATENT DOCUMENTS 7,617,101 B2 *  11/2009   Chang ................ G10L 15/08
                                              704/243
9,406,298 B2 *  8/2016   Cumani ............... G10L 17/02
(Continued)

FOREIGN PATENT DOCUMENTS

CN        101241669 A      8/2008
CN        102820033 A     12/2012
(Continued)

OTHER PUBLICATIONS

Li et. al. SNR-invariant PLDA with multiple speaker subspaces, 2016 IEEE International Conference on Acoustics, Speech and Signal Processing (ICASSP), 2016, pp. 5565-5569. (Year: 2016).*

(Continued)

*Primary Examiner* — Paras D Shah
*Assistant Examiner* — Anup Chandora
(74) *Attorney, Agent, or Firm* — Crowell & Moring LLP

(57) ABSTRACT

A voice identity feature extractor training method includes extracting a voice feature vector of training voice, The method may include determining a corresponding I-vector according to the voice feature vector of the training voice. The method may include adjusting a weight of a neural network model by using the I-vector as a first target output of the neural network model, to obtain a first neural network model, The method may include obtaining a voice feature vector of target detecting voice and determining an output result of the first neural network model for the voice feature vector of the target detecting voice. The method may include determining an I-vector latent variable. The method may include estimating a posterior mean of the I-vector latent variable, and adjusting a weight of the first neural network model using the posterior mean as a second target output, to obtain a voice identity feature extractor.

16 Claims, 8 Drawing Sheets

(51) Int. Cl.
  *G06N 3/08* (2006.01)
  *G10L 17/02* (2013.01)
  *G10L 17/18* (2013.01)

(56) References Cited

U.S. PATENT DOCUMENTS

| | | | | |
|---|---|---|---|---|
| 2017/0154640 A1* | 6/2017 | Wang | | G10L 25/24 |
| 2018/0061397 A1* | 3/2018 | Huang | | G10L 15/063 |
| 2019/0266998 A1* | 8/2019 | Liang | | G06F 17/16 |
| 2020/0111481 A1* | 4/2020 | Senior | | G10L 15/16 |
| 2020/0211567 A1* | 7/2020 | Wang | | G06N 7/005 |

FOREIGN PATENT DOCUMENTS

| | | | | | |
|---|---|---|---|---|---|
| CN | 103391201 A | | 11/2013 | | |
| CN | 104765996 A | | 7/2015 | | |
| CN | 105096121 A | | 11/2015 | | |
| CN | 106971713 A | | 7/2017 | | |
| CN | 107039036 A | * | 8/2017 | | |
| CN | 107146601 A | | 9/2017 | | |
| CN | 106098068 B | * | 7/2019 | ............. | G10L 17/08 |
| WO | WO-2018107810 A1 | * | 6/2018 | ............. | G10L 17/20 |

OTHER PUBLICATIONS

Kanagasundaram et. al. (2011). i-vector Based Speaker Recognition on Short Utterances . . . Proceedings of the Annual Conference of the International Speech Communication Association, INTERSPEECH. 10.21437/Interspeech.2011-58. (Year: 2011).*

Mahboob et. al. Speaker Identification Using GMM with MFCC. Mar. 2015. International Journal of Computer Science Issues (IJCSI) 12.2: 126-135. (Year: 2015).*

Souissi et. al. Artificial neural networks and support vector machine for voice disorders identification. May 2016. International Journal of Advanced Computer Science and Applications 7.5: 339-44. (Year: 2016).*

English Translation of Jing et. al. (Foreign Patent Document WO 2018107810 A1) (Year: 2016).*

English Translation of Zongyan et. al. (Foreign Patent Document CN-107146601-A) (Year: 2017).*

English Translation of Huang et. al. (Foreign Patent Document CN 106098068 B) (Year: 2019).*

English Translation of Yunzhi et. al. (Foreign Patent Document CN 107039036 A) (Year: 2017).*

Senoussaoui, et al. (2010). An i-vector extractor suitable for speaker recognition with both microphone and telephone speech. Proc. Odyssey Speaker and Language Recogntion Workshop, 2010. (Year: 2010).*

Dehak et al. (2011). Front-End Factor Analysis for Speaker Verification. Audio, Speech, and Language Processing, IEEE Transactions on. 19. 788-798. 10.1109/TASL.2010.2064307. (Year: 2011).*

Jiang et al. (2014). PLDA in the i-supervector space for text-independent speaker verification. EURASIP Journal on Audio, Speech, and Music Processing. 2014. 29. 10.1186/PREACCEPT-1667880097114310. (Year: 2014).*

International Search Report for corresponding International Patent Application PCT/CN2018/107385, dated Jan. 7, 2019 with English translation.

* cited by examiner

VOICE IDENTITY FEATURE EXTRACTOR AND CLASSIFIER TRAINING

PRIORITY

This application is a continuation of and claims priority to Patent Cooperation Treaty International Application No. PCT/CN2018/107385 filed Sep. 25, 2018, which claims priority to Chinese Patent Application No. 201710910880.X, entitled "VOICE IDENTITY FEATURE EXTRACTOR, CLASSIFIER TRAINING METHOD, AND RELEVANT DEVICE" filed with the Chinese Patent Office on Sep. 29, 2017, which is incorporated by reference in its entirety.

FIELD OF THE TECHNOLOGY

This application relates to the field of voice technologies, and specifically, to a voice identity feature extractor, a classifier training method, and a relevant device.

BACKGROUND OF THE DISCLOSURE

Because voice can be conveniently captured, easily stored, and is difficult to imitate, voice recognition is applied in an increasing quantity of identity recognition scenarios. For example, voice recognition is applied in information security applications related to information security and secrecy. Voice-based speaker identity recognition may be divided into two classes: speaker identification and speaker verification. The speaker identification may include determining, based on to-be-detected voice spoken by a speaker, whether the speaker is one of a set of registered speakers, and is a one-to-many recognition problem.

The speaker verification may include determining, based on to-be-detected voice spoken by a speaker, whether the speaker is a registered target speaker, and is a one-to-one verification problem.

In a case that speaker identity recognition is performed based on voice, a voice identity feature expressing identity information of a speaker needs to be extracted based on voice of the speaker, and be processed by using a pre-trained classifier, to implement speaker identity recognition.

SUMMARY

In view of the above, embodiments of this application provide a voice identity feature extractor, a classifier training method, and a relevant device, to provide a novel voice identity feature extractor and extract a novel voice identity feature with high reliability, and further, implement speaker identity recognition based on the novel voice identity feature and improve accuracy of the speaker identity recognition. A voice identity feature extractor training method is provided. The method may be applied to an electronic device. The method may include extracting a voice feature vector of training voice. The method may further include determining an I-vector corresponding to the training voice according to the voice feature vector of the training voice. The method may further include adjusting a weight of a neural network model by using the I-vector as a first target output of the neural network model, to obtain a first neural network model. The method may further include obtaining a voice feature vector of target detecting voice and determining an output result of the first neural network model for the voice feature vector of the target detecting voice. The method may further include determining an I-vector latent variable according to the output result. The method may further include estimating a posterior mean of the I-vector latent variable, and adjusting a weight of the first neural network model by using the posterior mean as a second target output of the first neural network model, to obtain a voice identity feature extractor.

A classifier training method is provided. The classifier method may be applied to an electronic device. The classifier method may include obtaining target detecting voice of a target speaker. The classifier method may further include extracting a voice feature vector of the target detecting voice. The classifier method may further include invoking a pre-trained voice identity feature extractor to input the voice feature vector of the target detecting voice into a voice identity feature extractor, to obtain a corresponding voice identity feature, the voice identity feature extractor being obtained by training an I-vector latent variable as a target output. The classifier method may further include training a classifier according to the voice identity feature.

A voice identity feature extractor training apparatus is provided. The apparatus may include A voice-feature-vector first extraction circuit, configured to extract a voice feature vector of training voice. The apparatus may include an I-vector determining circuit, configured to determine an I-vector corresponding to the training voice according to the voice feature vector of the training voice. The apparatus may include a first training circuit, configured to adjust a weight of a neural network model by using the I-vector as a first target output of the neural network model, to obtain a first neural network model. The apparatus may include a first result determining circuit, configured to obtain a voice feature vector of target detecting voice and determine an output result of the first neural network model for the voice feature vector of the target detecting voice. The apparatus may include a latent variable determining circuit, configured to determine an I-vector latent variable according to the output result. The apparatus may include a second training circuit, configured to estimate a posterior mean of the I-vector latent variable, and adjust a weight of the first neural network model by using the posterior mean as a second target output of the first neural network model, to obtain a voice identity feature extractor.

An electronic device including at least one memory is provided. The memory may store an executable program. The program may be used to extract a voice feature vector of a training voice. The program may be used to determine an I-vector corresponding to the training voice according to the voice feature vector of the training voice. The program may be used to adjust a weight of a neural network model by using the I-vector as a first target output of the neural network model, to obtain a first neural network model. The program may be used to obtain a voice feature vector of target detecting voice and determine an output result of the first neural network model for the voice feature vector of the target detecting voice. The program may be used to determine an I-vector latent variable according to the output result. The program may be used to estimate a posterior mean of the I-vector latent variable, and adjust a weight of the first neural network model by using the posterior mean as a second target output of the first neural network model, to obtain a voice identity feature extractor.

A classifier training apparatus is provided. The classifier training apparatus may include a target detecting voice obtaining circuit, configured to obtain target detecting voice of a target speaker. The classifier training apparatus may further include a voice-feature-vector second extraction circuit, configured to extract a voice feature vector of the target detecting voice. The classifier training apparatus may further include a voice identity feature extraction circuit, configured to invoke a pre-trained voice identity feature extractor to input the voice feature vector of the target detecting voice into a voice identity feature extractor, to obtain a corresponding voice identity feature, the voice identity feature extractor being obtained by training an I-vector latent variable as a target output. The classifier training apparatus may further include a training circuit, configured to train a classifier according to the voice identity feature.

An electronic device, including at least one memory, is provided. The memory may store an executable program. The program may be used to obtain target detecting voice of a target speaker. The program may be used to extract a voice feature vector of the target detecting voice. The program may be used to invoke a pre-trained voice identity feature extractor to input the voice feature vector of the target detecting voice into a voice identity feature extractor, to obtain a corresponding voice identity feature, the voice identity feature extractor being obtained by training an I-vector latent variable as a target output. The program may be used to train a classifier according to the voice identity feature.

A storage medium, which may be non-transitory and/or other than a transitory signal, is provided. The storage medium may be configured to store executable instructions. The storage medium may be configured to run the executable instructions on a computer causing the computer to perform the foregoing voice identity feature extractor training method or the foregoing classifier training method.

A computer program product including instructions is provided. The instructions, when executed on a computer, may cause the computer to perform the foregoing voice identity feature extractor training method or the foregoing classifier training method.

In an voice identity feature extractor training method, in a training stage, a neural network model is trained by using an existing I-vector extraction method and using an I-vector corresponding to training voice as a first target output of the neural network model and an original voice feature vector as an input of the neural network model, to obtain a first neural network model, Then, a voice feature vector of target detecting voice is obtained and inputted into the first neural network model, to obtain an I-vector of the target detecting voice. Based on this, an I-vector latent variable F-vector of the target detecting voice is determined, and the model is fine-tuned by using a posterior mean of the F-vector as a second target output of the neural network model, so as to obtain a voice identity feature extractor. The voice identity feature extractor can directly learn speaker information included in an original voice feature vector space, to obtain the I-vector latent variable F-vector representing the speaker information, which has relatively high reliability as a voice identity feature, so that a requirement on voice can be lowered, and an identity of the voice can still be accurately represented even though the a duration of the voice is relatively short. Compared with the I-vector, the F-vector extracted by the voice identity feature extractor has higher reliability.

BRIEF DESCRIPTION OF THE DRAWINGS

An Identity-vector (I-vector) is may be used as a voice identity feature. Although the I-vector can reflect an acoustic difference of a speaker and is a voice identity feature for performing speaker identity recognition, the reliability of the I-vector may depend on required voice inputs and in a case that a requirement is not met, for example, a duration of voice is relatively short, reliability of the I-vector can be reduced.

Therefore, providing a voice identity feature extractor to extract voice identity feature different from the I-vector, so as to improve reliability of the voice identity features, is a technical solution to a technical problem that improves the operation of the underlying voice recognition hardware.

To describe the technical solutions, the following briefly introduces the accompanying drawings required for describing the embodiments or the related technology. The accompanying drawings in the following description examples of the underlying techniques and architectures, and a person of ordinary skill in the art may still derive other implementations from the provided accompanying drawings without creative efforts.

Figure 1:
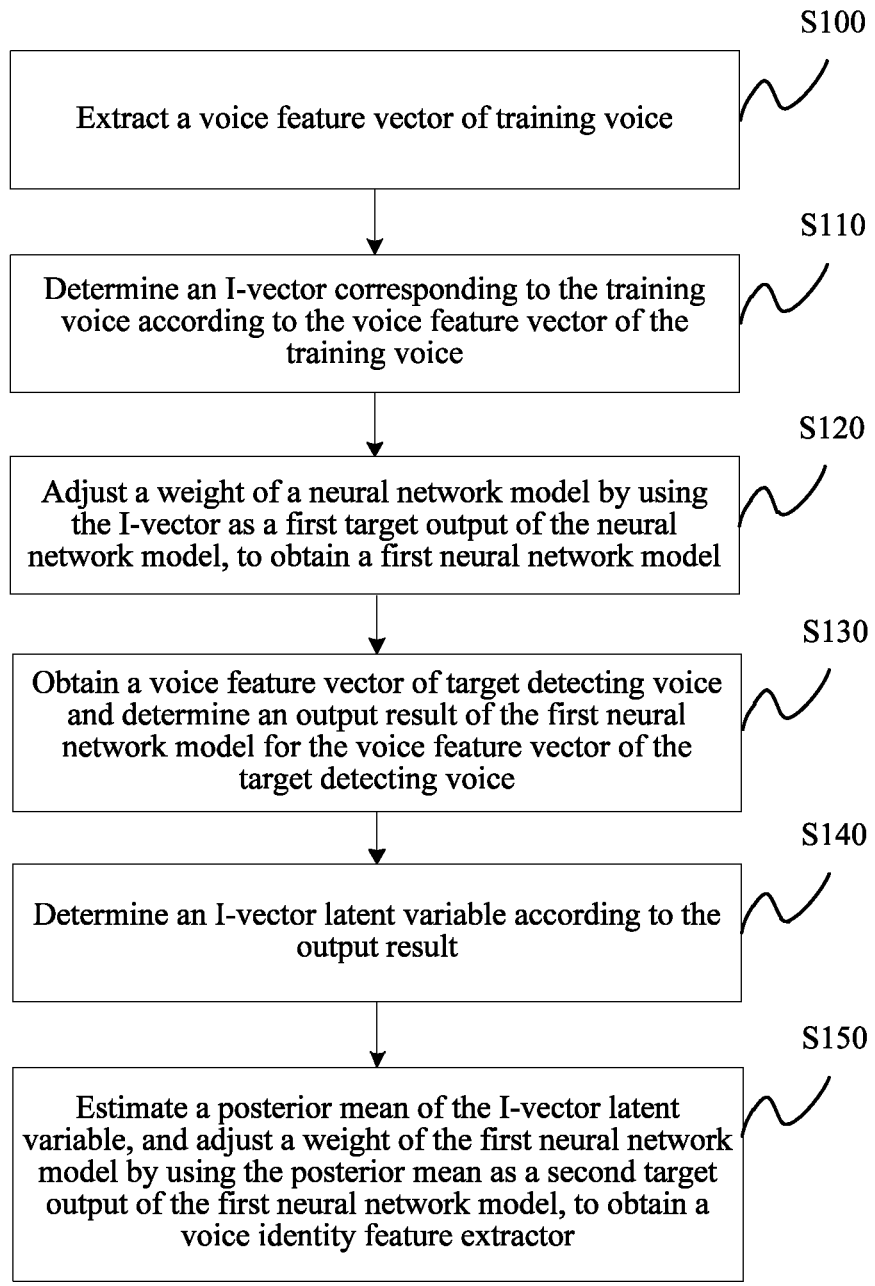

FIG. 1 is a flowchart of an example voice identity feature extractor training method.

Figure 2:
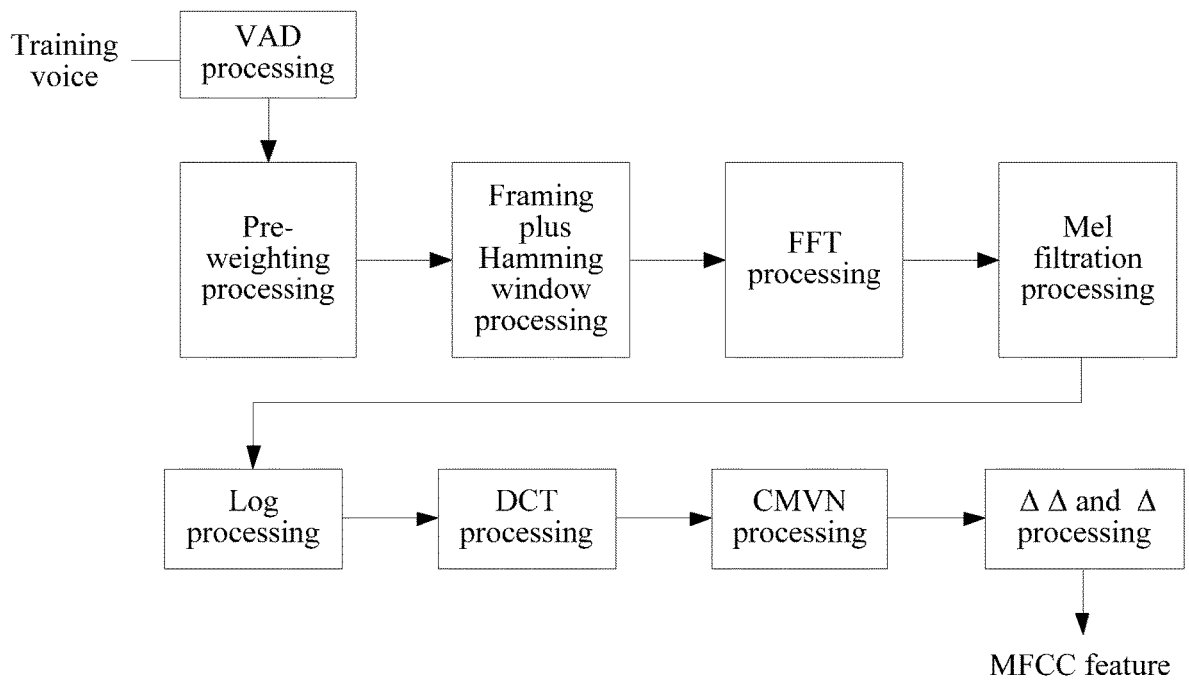

FIG. 2 is a schematic diagram of a process of pre-processing training voice.

Figure 3:
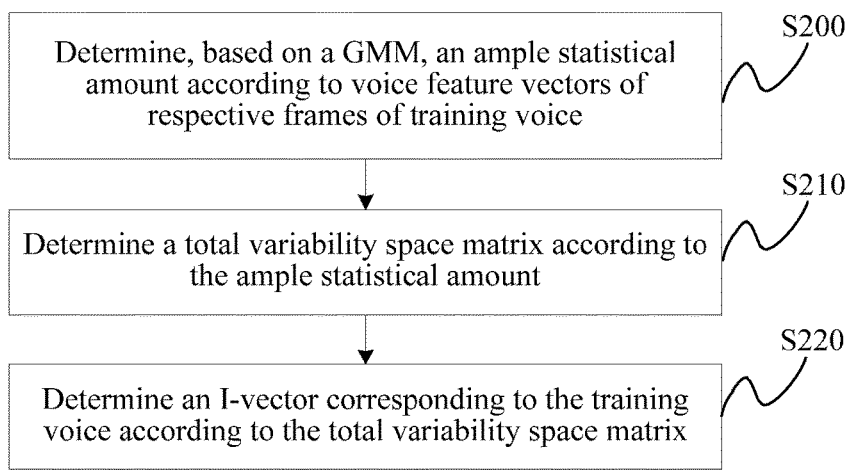

FIG. 3 is a flowchart of a method for determining an I-vector corresponding to training voice.

Figure 4:
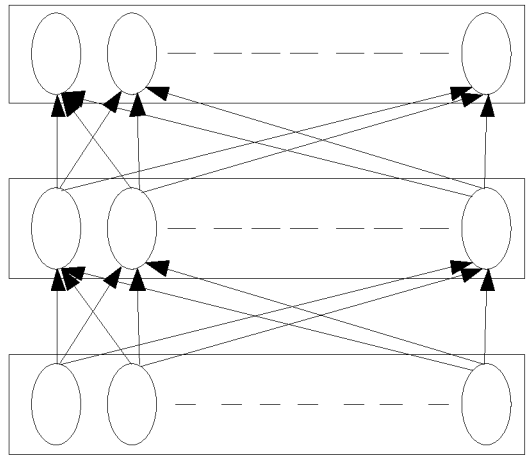

FIG. 4 is a schematic diagram of layer initialization of a neural network model.

Figure 5:
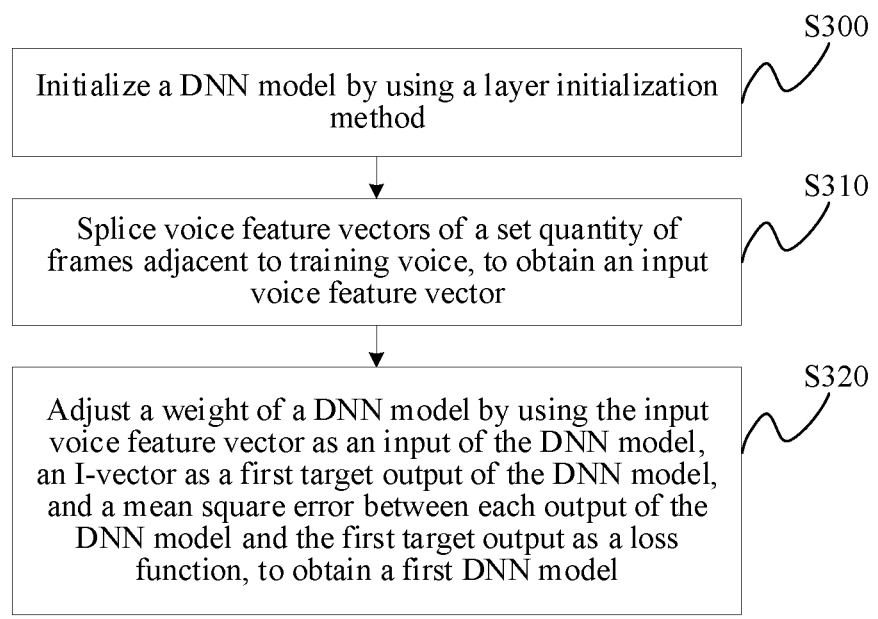

FIG. 5 is a flowchart of a method for obtaining a first neural network model by training.

Figure 6:
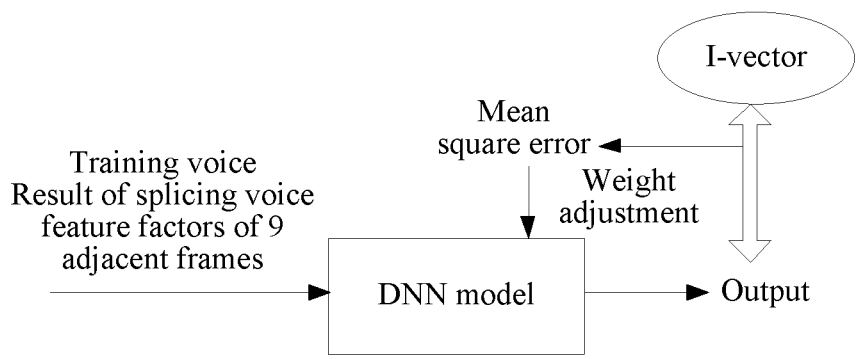

FIG. 6 is a schematic diagram of a process for obtaining a first neural network model by training.

Figure 7:
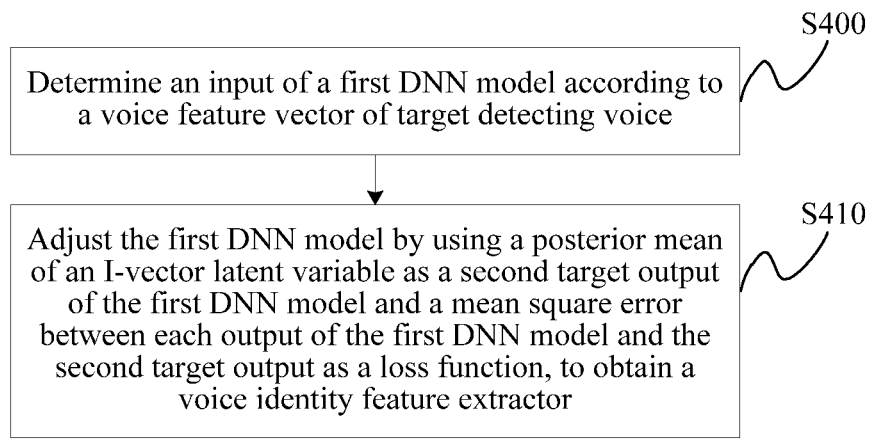

FIG. 7 is a flowchart of a method for obtaining a voice identity feature extractor based on a first neural network model by training.

Figure 8:
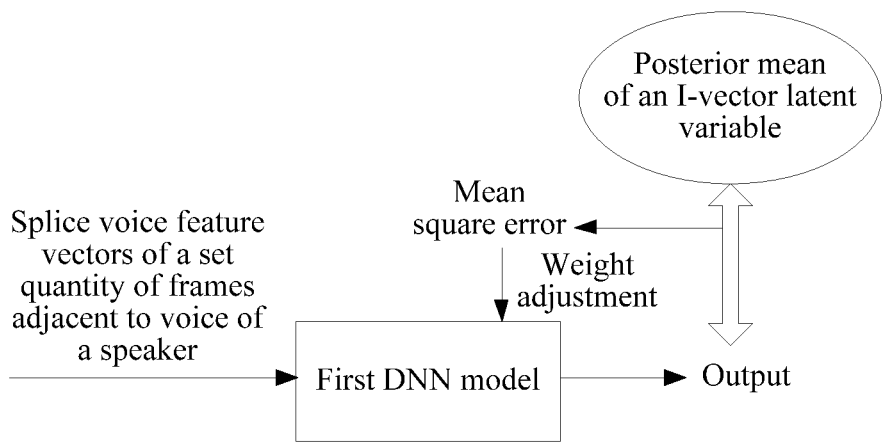

FIG. 8 is a schematic diagram of a process of obtaining a voice identity feature extractor by training.

Figure 9:
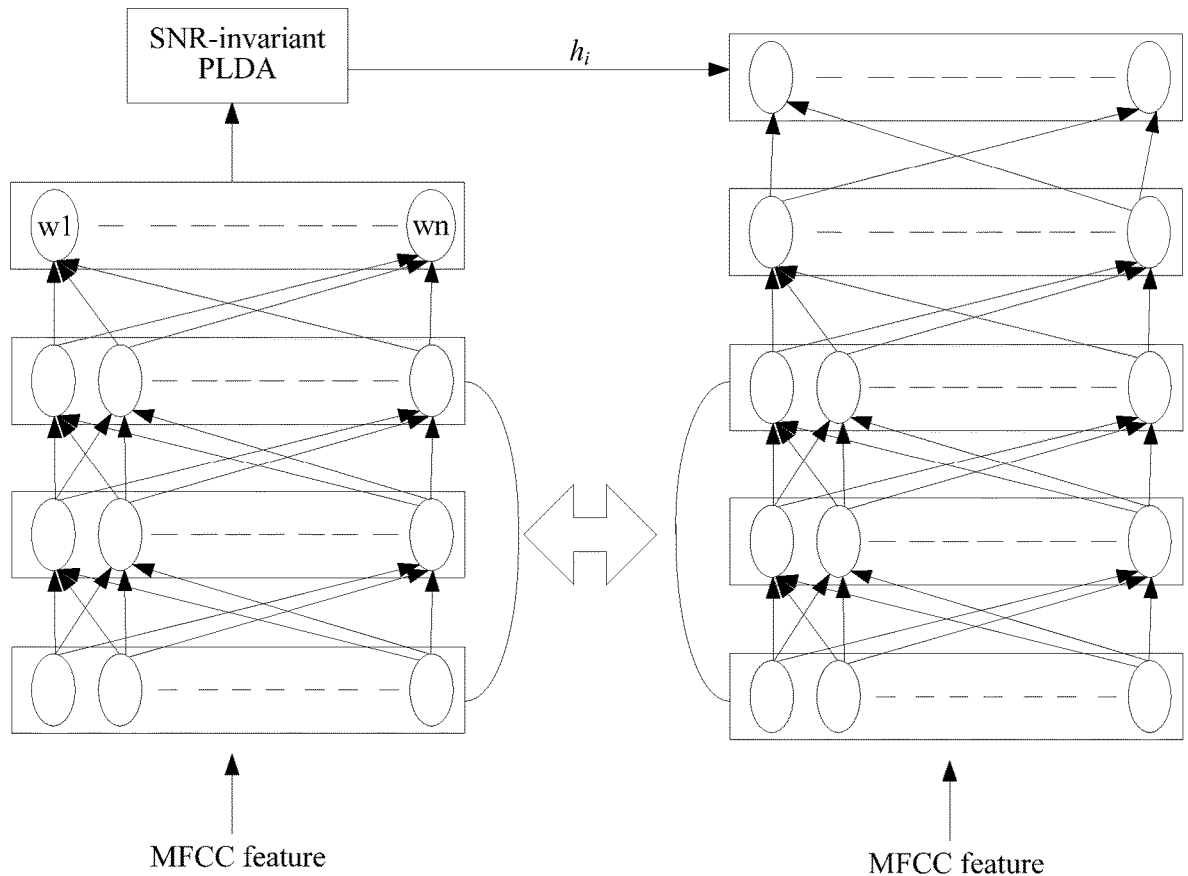

FIG. 9 is a schematic diagram of a process of training an F-vector extractor on a layer-initialized neural network model.

Figure 10:
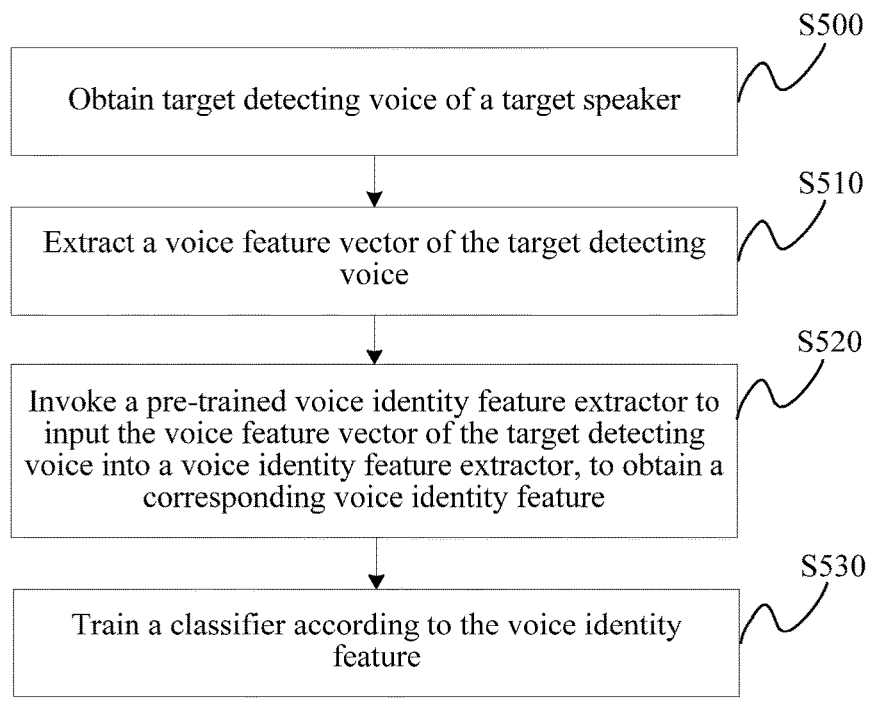

FIG. 10 is a flowchart of an example classifier training method.

Figure 11:
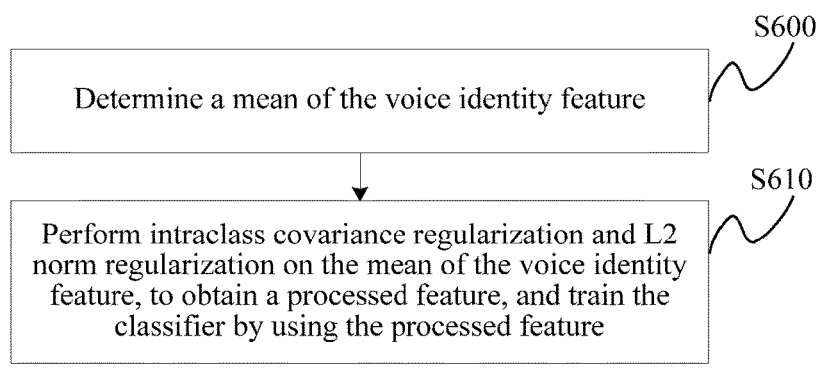

FIG. 11 is a flowchart of an example method for training a classifier according to a voice identity feature.

Figure 12:
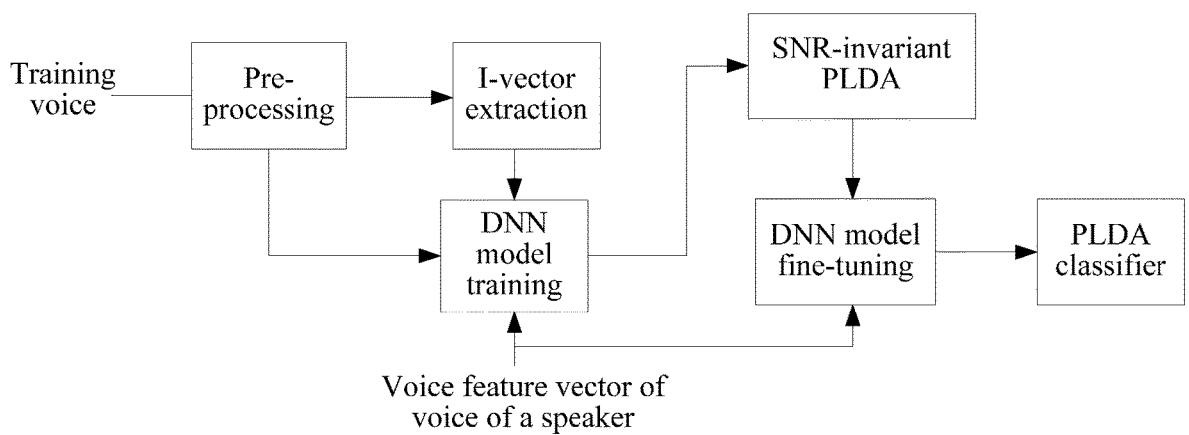

FIG. 12 is a schematic diagram of an example process of training an extractor and a classifier.

Figure 13:
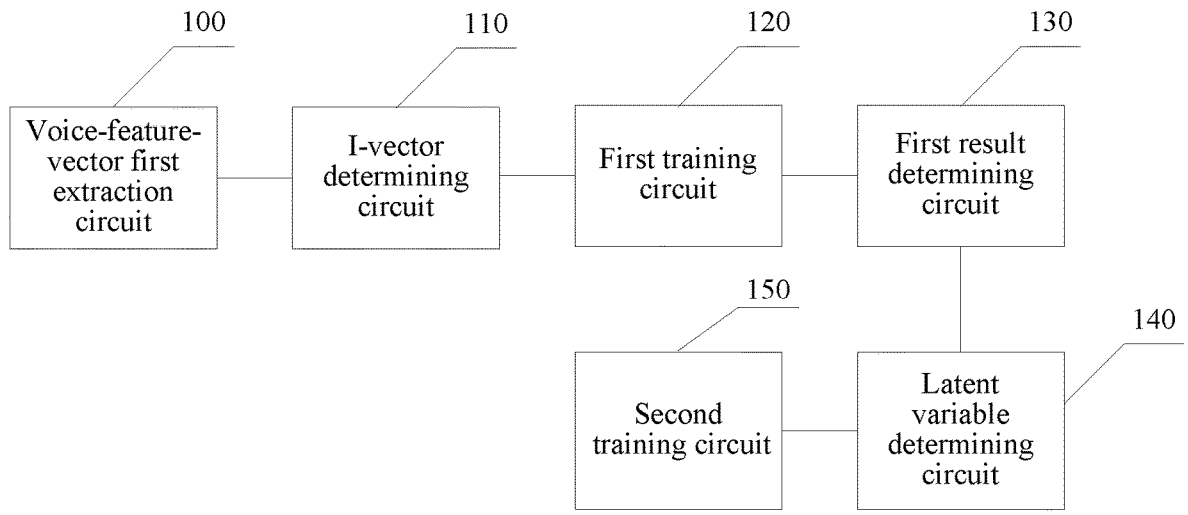

FIG. 13 is a structural block diagram of an example voice identity feature extractor training apparatus.

Figure 14:
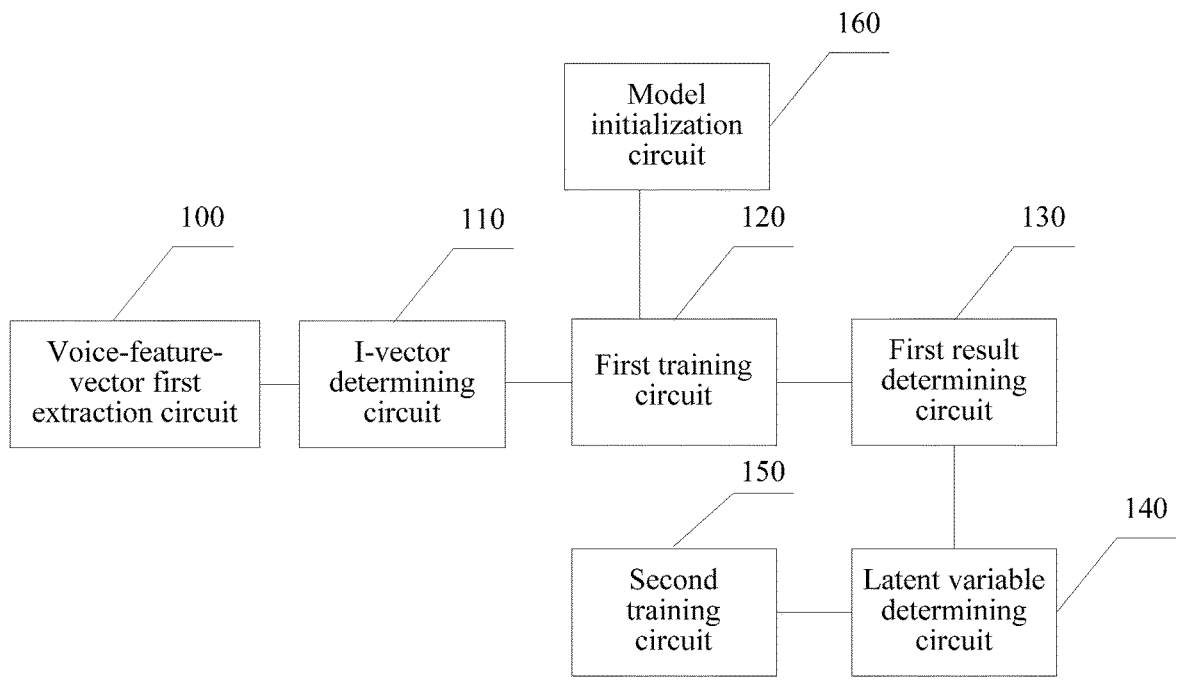

FIG. 14 is another structural block diagram of an example voice identity feature extractor training apparatus.

Figure 15:
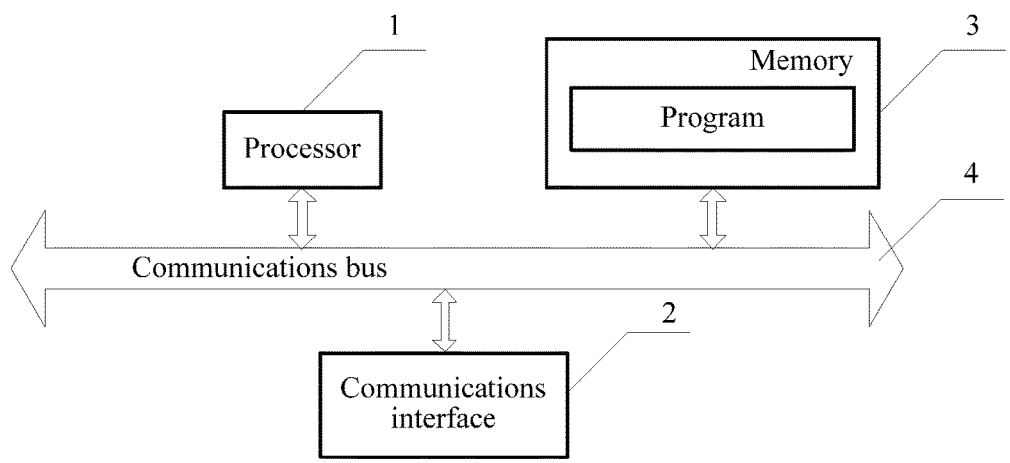

FIG. 15 is a block diagram of a hardware structure of an example electronic device.

Figure 16:
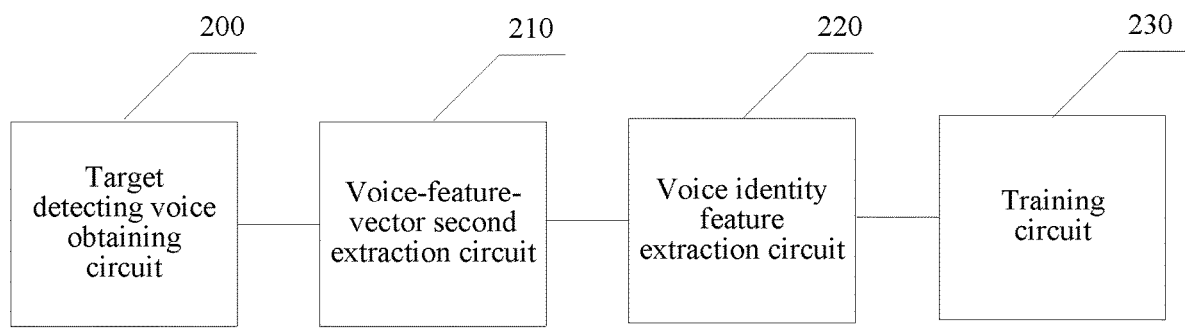

FIG. 16 is a structural block diagram of an example classifier training method.

DESCRIPTION OF EMBODIMENTS

The expressly described embodiments are some example embodiments of this application rather than all of the embodiments.

FIG. 1 is a flowchart of an example voice identity feature extractor training method. A novel voice identity feature extractor provided may be obtained by training by using the voice identity feature extractor training method, and a voice identity feature that has higher reliability and that is different from an I-vector may be extracted from voice based on the voice identity feature extractor.

The method shown in FIG. 1 may be applied to an electronic device having a data processing capability. The electronic device may be a server disposed on a network side or may be an electronic device, such as mobile phone or a personal computer (PC), on a user side. In various implementations, a program corresponding to the voice identity feature extractor training method is loaded in the electronic device, to implement the voice identity feature extractor training method.

Referring to FIG. 1, the voice identity feature extractor training method may be applied to an electronic device and includes the following operations.

Step S100: Extract a voice feature vector of training voice.

Optionally, the training voice may be obtained from a preset training voice set. In various implementations, a plurality of voice segments may be collected in advance and recorded in a training voice set. A voice segment collected in advance may be considered as a piece of training voice. The training voice may be voice satisfying a preset duration condition, and the voice may be alternatively referred to as longer voice. The preset duration condition may be that a duration equals a specified duration, a duration exceeds a specified duration, or a duration falls within a preset time range. In various implementations, the preset duration condition may specifically be that a duration exceeds 20 seconds, the voice satisfying the preset duration condition is voice whose duration exceeds 20 seconds, and the so-called longer voice is voice whose duration exceeds 20 seconds and is used as training voice. Certainly, the preset duration may alternatively be another value. This is not specifically limited herein. It is to be understood that compared with short voice, an I-vector extracted from longer voice has relatively high reliability, and performing training by using longer voice is beneficial to improving reliability of a model.

Optionally, a Mel Frequency Cepstral Coefficient (MFCC) feature may be selected as the voice feature vector, and a voice feature vector of training voice may be extracted by extracting an MFCC feature of the training voice.

Optionally, the training voice may be preprocessed, to extract voice feature vector of the training voice. In an optional implementation, referring to FIG. 2, an example pre-processing process may include voice endpoint detection (VAD) processing, pre-weighting processing, framing plus Hamming window processing, Fast Fourier Transformation (FFT) processing, Mel filtration processing, logarithm (Log) processing, inverse cosine transform (DCT) processing, cepstral mean and variance normalization (CMVN) processing, first order difference ($\Delta$) processing, and second order difference ($\Delta\Delta$), and the like.

Optionally, a voice feature vector of training voice may be constituted by voice feature vectors of respective frames of the training voice. Further, the voice feature vectors of the respective frames of the training voice may be integrated to form a voice feature vector sequence of the training voice. For example, a voice feature vector sequence of the $i^{th}$ piece of training voice may be represented as $X=\{x_1^i, x_2^i, \ldots, x_t^i\}$, where $x_t^i$ represents a voice feature vector of the $t^{th}$ frame of the $i^{th}$ piece of training voice.

Step S110: Determine an I-vector corresponding to the training voice according to the voice feature vector of the training voice.

After the voice feature vector of the training voice is extracted, in various implementations, the extracted voice feature vector of the training voice may be processed based on a Gaussian Mixture Model (GMM), to determine an I-vector corresponding to the training voice.

Because reliability of an I-vector depends on a requirements such as a voice duration, in a case of a short voice (which is a voice with a relatively short duration, where a duration threshold, such as 10 seconds, may be defined, and voice with a duration lower than the duration threshold) and the like, reliability of an I-vector is relatively low. Therefore, in various implementations, after the I-vector is determined, instead of directly using the I-vector as a voice identity feature of speaker identity recognition, subsequently, a novel voice identity feature extractor is further trained by using the I-vector.

Step S120: Adjust a weight of a neural network model by using the I-vector as a first target output of the neural network model, to obtain a first neural network model.

The voice identity feature extractor provided in various implementations may be trained based on a neural network model. The neural network model may be, for example, a Deep Neural Network (DNN). Certainly, neural network models in other forms, such as convolutional neural network (CNN), are not excluded.

In various implementations, a weight of the neural network model may be adjusted by using the I-vector corresponding to the training voice as a first target output of the neural network model, so that an output of the neural network model corresponds to the first target output, and an adjusted first neural network model is obtained. Optionally, in this process, in various implementations, a mean square error between each output of the neural network model and the first target output may be used as a loss function, to supervise adjustment on the weight of the neural network model, Thus, an output of the neural network model may finally approach the first target output (that is, the I-vector corresponding to the training voice), to obtain the first neural network model.

Optionally, the input used for adjusting the weight of the neural network model may be determined according to the voice feature vector of the training voice. In various implementations, an input voice feature vector may be determined according to the voice feature vector of the training voice. The weight of the neural network model may be adjusted by using the input voice feature vector as an input of the neural network model and the I-vector as a first target output of the neural network model.

Optionally, in a case that the input and the first target output of the neural network model are defined, the weight of the neural network model may be adjusted in various manners, to make the output of the neural network model approach the first target output. For example, an error back propagation algorithm may be used to adjust the weight of the neural network model. In a case that the input and the first target output of the neural network model are defined, a specific means for adjusting the weight of the neural network model may be achieved through various techniques.

Optionally, the input voice feature vector (which serves as the input of the neural network model may be obtained from voice feature vectors of respective frames of the training voice. In various implementations, voice feature vectors of a set quantity of frames adjacent to the training voice may be spliced to obtain the input voice feature vector. For example, MFCC features of 9 (the value herein is merely used for illustration) frames adjacent to the training voice may be spliced, to obtain an input voice feature vector as an input of the neural network model. In various implementations, voice feature vectors of a plurality of frames may alternatively be extracted from voice feature vectors of respective frames of training voice and be spliced to obtain an input voice feature vector.

Optionally, further, before the weight of the neural network model is adjusted, in various implementations, the neural network model may be initialized. For example, the neural network model (for example, a DNN model) is initialized by using a layer initialization method, so as to adjust the weight based on the layer-initialized neural network model.

Step S130: Obtain a voice feature vector of target detecting voice and determine an output result of the first neural network model for the voice feature vector of the target detecting voice.

After the first neural network model is obtained by training, in various implementations, target detecting voice may be obtained, a voice feature vector (for example, an MFCC feature) of the target detecting voice is extracted, and the voice feature vector of the target detecting voice is used as an input of the first neural network model, to determine an output result corresponding to the first neural network model (that is, obtaining an output result of the first neural network model for the voice feature vector of the target detecting voice).

The target detecting voice is voice for training the first neural network model. Therefore, the target detecting voice may be training voice obtained from a preset training voice set.

Step S140: Determine an I-vector latent variable according to the output result.

Optionally, after the output result of the first neural network model for the voice feature vector of the target detecting voice is obtained, in various implementations, a mean of the output result may be determined, to determine an I-vector latent variable in a process of training a signal-to-noise ratio (SNR)-invariant probability linear discriminant analysis (PLDA) model by using the means of the output result.

The latent variable is a proper noun in factor analysis theory in mathematics and may be considered as a latent variable.

Step S150: Estimate a posterior mean of the I-vector latent variable, and adjust a weight of the first neural network model by using the posterior mean as a second target output of the first neural network model, to obtain a voice identity feature extractor.

After the I-vector latent variable (that is, the latent variable of the I-vector) is obtained, the posterior mean includes more compact speaker information and has higher reliability. Therefore, in various implementations, a posterior mean of the I-vector latent variable may be used as a second target output for training the first neural network model. Therefore, the weight of the first neural network model may be adjusted to make the output of the first neural network model approach the second target output, so that a voice identity feature extractor can be obtained after the training is completed.

The posterior mean is a proper noun in probability theory in mathematics.

Optionally, in step S150, the input used for adjusting the weight of the first neural network model may be determined according to the voice feature vector of the target detecting voice. For example, voice feature vectors of a set quantity of frames adjacent to the target detecting voice may be spliced (optional illustration is provided in this manner), to obtain an input used for adjusting the weight of the first neural network model. The target detecting voice may be voice spoken by a target speaker (the target speaker may be considered as a legal speaker that needs to be registered).

In various implementations, a voice identity feature extractor is obtained by training with an I-vector latent variable that includes more compact speaker information and that has higher reliability as a target. Therefore, the voice identity feature extracted by using the voice identity feature extractor has higher reliability, and a novel voice identity feature with high reliability may be extracted. Different from the existing I-vector, in various implementations, the trained voice identity feature extractor may be referred to as an F-vector extractor, and a voice identity feature extracted based on the voice identity feature extractor may be referred to as an F-vector.

The voice identity feature extractor training method provided, in various implementations, includes. Extracting a voice feature vector of training voice. The method may further include determining an I-vector corresponding to the training voice according to the voice feature vector of the training voice. The method may further include adjusting a weight of a neural network model by using the I-vector as a first target output of the neural network model, to obtain a first neural network model. The method may further include after obtaining the first neural network model, obtaining a voice feature vector of target detecting voice and determining an output result of the first neural network model for the voice feature vector of the target detecting voice, so as to determine an I-vector latent variable according to the output result. The method may further include estimating a posterior mean of the I-vector latent variable, and adjusting a weight of the neural network model by using the posterior mean as a second target output of the neural network model, to obtain a voice identity feature extractor, so that the voice identity feature extractor is trained.

In the voice identity feature extractor training method provided in various implementations, based on the neural network model, a voice identity feature extractor is obtained by training by using a posterior mean of the I-vector latent variable that includes more compact speaker information and that has higher reliability as a target, so that the voice identity feature extracted by using the voice identity feature extractor has higher reliability and a requirement on voice may be lowered. A novel voice identity feature extractor may be obtained by training by using the training method to provide possibility for extraction of a novel voice identity feature with high reliability.

To better understand a defect of the I-vector and describe a method for determining an I-vector provided in various implementations. FIG. 3 shows a flowchart of an example method for determining an I-vector corresponding to training voice. Referring to FIG. 3, the method may include the following operations.

Step S200: Determine, based on a GMM, an ample statistical amount according to voice feature vectors of respective frames of the training voice.

A voice feature vector of training voice may be constituted by voice feature vectors of respective frames of the training voice. Further, the voice feature vectors of the respective frames of the training voice may be integrated to form a voice feature vector sequence of the training voice.

Optionally, a voice feature vector sequence of the $i^{th}$ piece of training voice may be represented as $X=\{x_1^i, x_2^i, \ldots, x_t^i\}$, where $x_t^i$ represents a voice feature vector of the $t^{th}$ frame of the $i^{th}$ piece of training voice.

A GMM based on the $k^{th}$ order may determine an ample statistical amount according to the following formulas:

$$N_k^i = \sum_t \gamma_{kt}^i,$$

where $N_k^i$ represents a $0^{th}$ order ample statistical amount, and $\gamma_{kt}^i$ represents an occupation ratio of a voice feature vector of the $t^{th}$ frame to the $k^{th}$ order; and $$F_k^i = \sum_t \gamma_{kt}^i (x_t^i - m_k),$$

where $F_k^i$ represents a first order ample statistical amount, where the GMM of the $k^{th}$ order may be represented as $\lambda = \{w_k, m_k, \Sigma_k\}_{k-1}^K$, the lowercase k represents an order number of the GMM, w represents a weight, m represents a mean, and the uppercase K represents a co-variance.

Step S210: Determine a total variability space matrix according to the ample statistical amount.

After the ample statistical amount is determined, a total variability space matrix used in an I-vector extraction algorithm may be determined based on the ample statistical amount. Optionally, a total variability space matrix may be resolved iteratively according to the ample statistical amount by using an Expectation Maximization (EM) algorithm. The EM algorithm may be considered as a method for iteratively resolving a type of special maximum likelihood problems.

Step S220: Determine the I-vector corresponding to the training voice according to the total variability space matrix.

After the total variability space matrix is obtained, an I-vector corresponding to the training voice may be calculated according to a result of splicing the total variability space matrix, a block diagonal matrix constituted by a $0^{th}$ order ample statistical amount, and a first ample statistical amount.

Optionally, the I-vector may be determined by using the following formula:

$(I + T^T \Sigma^{-1} \tilde{N} T)^{-1} T^T \Sigma^{-1} \tilde{F}$, where $I$ represents a unit matrix, $T$ (bold) represents a total variability space matrix, T (not bold) represents a scalar value, $\tilde{N}$ represents a block diagonal matrix, diagonal block components of a block diagonal matrix are $N_k^i I, \ldots, N_k^i I$, $\tilde{F}$ is spliced by $F_k^i, \ldots, F_K^i$, and $\Sigma$ represents a diagonal matrix, where diagonal elements of the diagonal matrix are elements of a diagonal co-variance matrix of each mixture in the GMM.

Optionally, after the I-vector is obtained, its posterior co-variance may be represented as $(I + T^T \Sigma^{-1} \tilde{N} T)^{-1}$. It can be learned that in a case that a voice duration is a shorter duration, a value of a $0^{th}$ order statistical amount corresponding thereto is smaller. In this case, a posterior co-variance is larger, and the estimated I-vector is less reliable. This indicates that reliability of the I-vector imposes a relatively high requirement on a duration of voice, and in a case of short voice or the like, the I-vector may be unreliable.

In various implementations, after the I-vector corresponding to the training voice is obtained, the weight of the neural network model may be adjusted in a form of a DNN or the like by using the I-vector as the first target output, so as to implement first training of the neural network model to obtain a first neural network model. Further, based on the first neural network model, a weight of the first neural network model is adjusted by using the posterior mean of the I-vector latent variable as a second target output, to obtain a voice identity feature extractor.

Optionally, the neural network model used in various implementations may be a DNN model, a CNN model, or the like. That is, the neural network model used for obtaining the first neural network model by training may be a DNN model or a CNN model. Correspondingly, the first neural network model may also be a DNN model, a CNN model, or the like.

The DNN model is a deep learning framework model. A structure of the DNN model mainly includes: one input layer, a plurality of latent layers, and one output layer. Generally, the first layer of the DNN model is the input layer, the last layer is the output layer, the plurality of latent layers exists therebetween, and in the DNN model, layers are fully connected to each other.

Optionally, using a DNN model as an example, in a process of adjusting a weight (that is, a parameter) of the DNN model by using the I-vector as a first target output, to obtain a first DNN model (a form of the first neural network model). In various implementations, a weight of the DNN model may be adjusted by using an error back propagation algorithm or the like (certainly, another manner of adjusting a weight of a DNN model may alternatively be used), to make an output of the adjusted DNN model approach the first target output, to obtain a first DNN model. In this process, the adjusted weight of the DNN model mainly includes a weight for connecting linear transformation between respective layers of the DNN model (for example, a weight for connecting linear transformation an input layer and a latent layer, a weight for connecting linear transformation between respective latent layers, and a weight for connecting linear transformation between a latent layer and an output layer).

Correspondingly, in a process of adjusting a weight of the first DNN model by using the I-vector latent variable as a second target output, to obtain a voice identity feature extractor. In various implementations, the weight of the first DNN model may alternatively be adjusted by using an error back propagation algorithm or the like, to make an output of the adjusted first DNN model approach the second target output, to obtain the voice identity feature extractor. In this process, the adjusted weight of the first DNN model may also include a weight for connecting linear transformation between respective layers of the DNN model.

Using a CNN model as an example, a structure of the CNN model mainly includes an input layer, a convolutional layer, a pooling layer, and a fully connected layer. The convolutional layer and pooling layer may include a plurality of layers. Optionally, in a process of adjusting a weight (that is, a parameter) of the CNN model by using the I-vector as a first target output, to obtain a first CNN model (a form of the first neural network model), in various implementations, a weight of the CNN model may be adjusted by using an error back propagation algorithm or the like (certainly, another manner of adjusting a weight of a CNN model may alternatively be used), to make an output of the adjusted CNN model approach the first target output, to obtain a first CNN model. In this process, the adjusted weight of the DNN model may include elements in model parameters of the CNN model, such as a bias matrix of the convolutional layer, a weight matrix of the fully connected layer, and a bias vector of the fully connected layer.

Correspondingly, in a process of adjusting a weight of the first CNN model by using the I-vector latent variable as a second target output, to obtain a voice identity feature extractor. In various implementations, the weight of the first CNN model may alternatively be adjusted by using an error back propagation algorithm or the like, to make an output of the adjusted first CNN model approach the second target output, to obtain the voice identity feature extractor. In this process, the adjusted weight of the first DNN model may include elements in model parameters of the CNN model, such as an initial bias matrix of the convolutional layer, an initial weight matrix of the fully connected layer, and an initial bias vector of the fully connected layer.

The foregoing structure and weight adjusting means of the neural network model are optional. In a case that an input and a target output of the neural network model are defined, any weight adjusting means for making an output of the neural network model approach the target output may be used in various implementations. Weight adjustment of the neural network model may be an iterative adjustment process, and the weight of the neural network model is iteratively adjusted, to make the output of the neural network model approaches the target output.

Optionally, in various implementations, the neural network model may first be initialized by using a layer initialization method, to obtain a neural network model structure as shown in FIG. 4, based on which a first neural network model is obtained by training.

Using a neural network model in a DNN form as an example, FIG. 5 shows a flowchart of a method for obtaining a first neural network model by training. Referring to FIG. 5, the method may include the following operations:

Step S300: Initialize a DNN model by using a layer initialization method.

Step S310: Splice voice feature vectors of a set quantity of frames adjacent to training voice, to obtain an input voice feature vector.

Step S320: Adjust a weight of the DNN model by using the input voice feature vector as an input of the DNN model, the I-vector as a first target output of the DNN model, and a mean square error between each output of the DNN model and the first target output as a loss function, to obtain a first DNN model.

Optionally, in an example, as shown in FIG. 6 the weight of the DNN model may be iteratively adjusted by using spliced voice feature vectors of 9 frames adjacent to training voice as an input of the DNN model and a mean square error between each outputted result of the DNN model and the first target output as a loss function until an output of the DNN model approaches the first target output. Thus, a training convergence condition is met, and a first DNN model is obtained.

After training of the first neural network model is completed, an I-vector latent variable may be determined based on target detecting voice. Optionally, an output result of the first neural network model corresponding to a voice feature vector of target detecting voice may be calculated. For example, it is assumed that a corresponding output result of the first neural network model may be calculated for a voice feature vector of the $i^{th}$ piece of voice of the $s^{th}$ speaker. Then, a mean (which is set to $V_{si}$) of the output result is determined, a signal-to-noise ratio-invariant probability linear discriminant analysis (SNR-invariant PLDA) model is trained by using the mean as training data, and the I-vector latent variable may be obtained in a training process.

Optionally, the SNR-invariant PLDA model may be trained according to the following formula:

$V_{si}^b = m + Rh_i + Ug_b + \varepsilon_{si}^b$, where $V_{si}^b$ is $V_{si}$ representing a mean of an output result of the first neural network model for a voice feature vector of the $i^{th}$ piece of voice of the $s^{th}$ speaker, b represents a signal-to-noise ratio range corresponding to the target detecting voice, m represents a mean of output results for voice feature vectors all pieces of target detecting voice, R represents a speaker information space, U represents a signal-to-noise ratio space, $h_i$ represents an I-vector latent variable, $g_b$ represents a signal-to-noise ratio factor, and $\varepsilon_{si}^b$ represents a residual.

In a process of training the SNR-invariant PLDA model, after the I-vector latent variable is determined. A posterior mean of the I-vector latent variable may be estimated. The posterior mean includes more compact speaker information and may be used as a target output to adjust the weight of the first neural network model, These may be used to obtain an F-vector extractor by training (that is, the first neural network model is trained by using the posterior mean as the target output, and a model result after training convergence is the obtained F-vector extractor).

Optionally, using a neural network model in a DNN form as an example, FIG. 7 shows a flowchart of an example method for obtaining a voice identity feature extractor (F-vector extractor) based on a first neural network model by training. Referring to FIG. 7, the method may include the following operations.

Step S400: Determine an input of a first DNN model according to a voice feature vector of target detecting voice.

Optionally, voice feature vectors of a set quantity of frames adjacent to the target detecting voice may be spliced, to obtain the input of the first DNN model.

Step S410: Adjust the first DNN model by using a posterior mean of an I-vector latent variable as a second target output of the first DNN model and a mean square error between each output of the first DNN model and the second target output as a loss function, to obtain a voice identity feature extractor.

Optionally, in an example, as shown in FIG. 8, in various implementations, a weight of the first DNN model may be iteratively adjusted by using spliced voice feature vectors of a set quantity of frames adjacent to target detecting voice as an input of the first DNN model, a posterior mean of an I-vector latent variable as a second target output of the first neural network model, and a mean square error between each result outputted by the first DNN model and the second target output as a loss function until an output of the first DNN model approaches the second target output, to meet a training convergence condition and obtain a voice identity feature extractor (F-vector extractor).

Optionally, based on initializing the DNN model by using a layer initialization method, a training process of the example F-vector extractor is shown in FIG. 9, which may be referred to, where w1 represents the first dimension of the I-vector, and wn represents the $n^{th}$ dimension of the I-vector.

In the training method provided in various implementations, based on the neural network model, a novel voice identity feature extractor is obtained by training by using a posterior mean of the I-vector latent variable that includes more compact speaker information and that has higher reliability as a target, so that extraction of a novel voice identity feature with high reliability may be implemented to provide a guarantee with higher accuracy for subsequently performing speaker identity recognition based on a voice identity feature.

Based on the foregoing voice identity feature extractor obtained by training, in various implementations, a classifier for identifying different speakers can be trained based on the voice identity feature extractor, and the classifier may be trained based on voice of a predetermined speaker (for example, a speaker that needs to be registered).

Optionally, FIG. 10 shows a flowchart of an example classifier training method. Referring to FIG. 10, the method may be applied to an electronic device and includes the following operations.

Step S500: Obtain target detecting voice of a target speaker.

In various implementations, a requirement on target detecting voice is relatively low, and a duration of the target detecting voice is random. The target detecting voice of the target speaker may be voice of a legal speaker that needs to be registered. In various implementations, a classifier may be trained with regard to the target speaker and based on a speaker verification scenario. Subsequently, voice of the target speaker may be identified by using the classifier obtained by training, to implement speaker verification with higher precision.

Step S510: Extract a voice feature vector of the target detecting voice.

Optionally, in various implementations, an MFCC feature of the target detecting voice may be extracted.

Step S520: Invoke a pre-trained voice identity feature extractor to input the voice feature vector of the target detecting voice into a voice identity feature extractor, to obtain a corresponding voice identity feature.

Based on the foregoing description that the voice identity feature extractor is obtained by using an I-vector latent variable as a target output, to obtain the voice identity feature extractor (F-vector extractor) by training, in various implementations, the voice feature vector of the target detecting voice may be used as an input of the F-vector extractor, and the F-vector extractor may correspondingly output a voice identity feature (F-vector).

With regard to the $i^{th}$ piece of voice of a speaker s, its MFCC feature may be extracted and then, is used as an input of the F-vector extractor, to obtain a corresponding F-vector.

Step S530: Train a classifier according to the voice identity feature.

After the voice identity feature is obtained, a mean of the voice identity feature may be determined, to perform training by using the mean to obtain the classifier.

Optionally, in various implementations, the classifier obtained by training may be used in a text-independent speaker verification scenario. As stated above, voice-based speaker identity recognition may be divided into two classes: speaker identification and speaker verification. Moreover, in terms of a requirement on voice, the voice-based speaker identity recognition may alternatively be divided into two classes: a text-dependent class and a text-independent class. Being text-dependent indicates to-be-detected voice spoken by a speaker needs to have a same semantic meaning as registered voice, and is applied to an occasion where a speaker is relatively cooperative, and being text-independent indicates that semantic content in voice may not be focused, there are fewer limitation factors, and application is more flexible.

Because text-independent speaker identity recognition is not limited by semantic content, usually, a voice mismatching phenomenon may occur in training and testing stages, and to obtain better recognition performance, a large amount of training voice is often needed. Moreover, because the classifier provided in various implementations is obtained by training based on a novel voice identity feature having a relatively low requirement on voice, a situation that recognition accuracy of the classifier decreases as a duration of the voice becomes shorter may be greatly alleviated, to provide possibility for relatively accurate speaker identity recognition.

Optionally, the classifier provided in various implementations may be a probability linear discriminant analysis (PLDA) classifier. An optional process of training a classifier according to a voice identity feature may, as shown in FIG. 11, include:

Step S600: Determine a mean of the voice identity feature.

It is assumed that after a voice identity feature of the $i^{th}$ piece of voice from a speaker L is extracted, a mean $y_{si}$ of the voice identity feature may be determined.

Step S610: Perform intraclass covariance regularization and L2 norm regularization on the mean of the voice identity feature, to obtain a processed feature, and train the classifier by using the processed feature.

Optionally, after intraclass covariance regularization and L2 norm regularization are performed on the mean $y_{li}$ of the voice identity feature, and a PLDA classifier may be obtained by training by using a processed feature as training data.

Optionally, a non-parameter discriminant analysis algorithm is effectively embedded into a PLDA classifier, to improve training precision of a PLDA classifier. The PLDA classifier, in various implementations, may be based on non-parameter PLDA models of the following two types of co-variance matrices (that is, the intraclass co-variance matrix and the non-parameter interclass co-variance matrix described below):

(1) Intraclass variance matrix, whose calculation manner is as follows:

$$\Phi_w = \frac{1}{S}\sum_{s=1}^{S} \frac{1}{H_s}\sum_{i=1}^{H_s} (y_{si} - u_s)(y_{si} - u_s)^T,$$

where

S (uppercase) represents a quantity of speakers, s (lowercase) represents the $s^{th}$ speaker, $H_s$ represents a quantity of pieces of voice of the $s^{th}$ speaker, and $u_s$ is a mean of the $s^{th}$ speaker.

(2) Non-parameter interclass co-variance matrix, which may be calculated by using the following formulas:

$$\Phi_b = \frac{1}{S}\sum_{s=1}^{S} \frac{1}{S}\sum_{k=1, k \neq S}^{S} \frac{1}{H_s}\sum_{i=1}^{H_s} g(s, k, i)(y_{si} - m_k(y_{si}))(y_{si} - m_k(y_{si}))^T, \text{ and}$$

$$m_k(y_{si}) = \frac{1}{Q}\sum_{q=1}^{Q} \phi_{kq}(y_{si}),$$

where $\phi_{kq}(y_{si})$ represents the $q^{th}$ feature closest to the feature $y_{si}$ in features of a speaker k, Q is a total quantity of adjacent features, $m_k(y_{si})$ represents a mean of Q adjacent features, and g(s, k, i) represents a weight function, which is defined as follows:

$$g(s, k, i) = \frac{\min\{d^\alpha(y_{si}, \phi_{sQ}(y_{si})), d^\alpha(y_{si}, \phi_{kQ}(y_{si}))\}}{d^\alpha(y_{si}, \phi_{sQ}(y_{si})) + d^\alpha(y_{si}, \phi_{kQ}(y_{si}))},$$

where an exponential parameter $\alpha$ is weighted adjustment of a distance metric function $d(y_1, y_2)$, $d(y_1, y_2)$ indicates a Euclidean distance measure between features $y_1$ and $y_2$, a value of a parameter Q is usually set to a mean of total quantities of pieces of voice of all speakers, and a weight function g(s, k, i) evaluates proximity between a projected feature $y_{si}$ and a class boundary between local speakers, so as to determine contribution of the feature $y_{si}$ to a non-parameter interclass divergence matrix $\Phi_b$. In a case that the feature $y_{si}$ is close to the class boundary, a value of the weight function g(s, k, i) is set to a maximum value 0.5, and if the feature $y_{si}$ is distant from the class boundary, a value of the weight function g(s, k, i) is also reduced accordingly.

The feature in the formulas above is a voice identity feature.

After the intraclass co-variance matrix and the non-parameter interclass co-variance matrix are obtained, in various implementations, an intraclass variation matrix in a PLDA classifier scoring function may be replaced with the intraclass co-variance matrix, and an interclass variation matrix may be replaced with the non-parameter interclass co-variance matrix. Specifically, for a first voice identity feature extractor $y_1$ and a second voice identity feature extractor $y_2$ that are given and that have been registered, a score of the PLDA classifier (a score representing accuracy of the PLDA classifier) may be calculated as follows:

$$\text{score}(y_1, y_2) = (y_1 - \mu)^T \Phi_w (y_1 - \mu) + 2(y_1 - \mu)^T \Phi_b (y_2 - \mu) + (y_2 - \mu)^T \Phi_w (y_2 - \mu),$$

where u is an overall mean, that is, a mean of a F-vector training set.

After the classifier is obtained by training, in various implementations, voice of a target speaker and voice of other speakers may be identified based on the classifier, to implement speaker verification with higher precision. During speaker identity recognition, in various implementations, a voice feature vector of a current speaker may be extracted. A corresponding voice identity feature may be extracted based on the voice feature vector of the current speaker by using a voice identity feature extractor. The voice identity feature is inputted into the classifier trained for the target speaker, whether the current speaker is the target speaker is identified by using an output result of the classifier, so that identity recognition of the current speaker is implemented.

Optionally, a simplified process of training the extractor and the classifier may include, as shown in FIG. 12: using an I-vector corresponding to training voice as supervised information of a DNN model, establishing a mapping from a voice feature vector to an I-vector feature space, extracting the I-vector, and training the DNN model by using the I-vector as a target. The process may further include, subsequently, to obtain more compact speaker information, determining an I-vector latent variable in an SNR-invariant PLDA modeling process, and further, fine-tuning the DNN model based on supervised information of an I-vector latent variable, to obtain a final F-vector extractor. The process may further include, extracting an F-vector of voice by using the F-vector extractor, and implementing a PLDA classifier for speaker identity recognition based on the F-vector.

A voice identity feature extractor training apparatus is introduced below. The voice identity feature extractor training apparatus described below may be considered as a program circuit that needs to be set by an electronic device (a form of the electronic device may be, for example, a server or a terminal) for implementing the voice identity feature extractor training method. The voice identity feature extractor training apparatus described below and the voice identity feature extractor training method described above correspond and refer to each other.

FIG. 13 is a structural block diagram of an example voice identity feature extractor training apparatus. Referring to FIG. 13, the voice identity feature extractor training apparatus may include a voice-feature-vector first extraction circuit 100, configured to extract a voice feature vector of training voice. The voice identity feature extractor training apparatus may further include an I-vector determining circuit 110, configured to determine an I-vector corresponding to the training voice according to the voice feature vector of the training voice. The voice identity feature extractor training apparatus may further include a first training circuit 120, configured to adjust a weight of a neural network model by using the I-vector as a first target output of the neural network model, to obtain a first neural network model. The voice identity feature extractor training apparatus may further include a first result determining circuit 130, configured to obtain a voice feature vector of target detecting voice and determine an output result of the first neural network model for the voice feature vector of the target detecting voice. The voice identity feature extractor training apparatus may further include a latent variable determining circuit 140, configured to determine an I-vector latent variable according to the output result. The voice identity feature extractor training apparatus may further include a second training circuit 150, configured to estimate a posterior mean of the I-vector latent variable, and adjust a weight of the first neural network model by using the posterior mean as a second target output of the first neural network model, to obtain a voice identity feature extractor.

Optionally, the first training circuit 120 being configured to adjust a weight of a neural network model by using the I-vector as a first target output of the neural network model, to obtain a first neural network model, by determining an input voice feature vector according to the feature vector of the training voice; and adjusting the weight of the neural network model by using the input voice feature vector as an input of the neural network model, the I-vector as the first target output of the neural network model, and a mean square error between each output of the neural network model and the first target output as a loss function, to obtain the first neural network model.

Optionally, the first training circuit 120 being configured to determine an input voice feature vector according to the feature vector of the training voice may include splicing voice feature vectors of a set quantity of frames adjacent to the training voice, to obtain the input voice feature vector.

Optionally, FIG. 14 shows another structural block diagram of an example voice identity feature extractor training apparatus. With reference to FIG. 13 and FIG. 14, the voice identity feature extractor training apparatus may further include a model initialization circuit 160, configured to initialize the neural network model by using a layer initialization method.

Optionally, the model initialization circuit 160 may initialize the neural network model by using a layer initialization method before the weight of the neural network model is adjusted. Correspondingly, the first training circuit 120 may implement functions based on the initialized neural network model.

Optionally, the latent variable determining circuit 140 being configured to determine an I-vector latent variable according to the output result by determining a mean of the output result, training a signal-to-noise ratio-invariant probability linear discriminant analysis (SNR-invariant PLDA) model by using the mean, and calculating the I-vector latent variable in a training process.

Optionally, the latent variable determining circuit 140 being configured to calculate the I-vector latent variable in a training process by calculating an I-vector latent variable $h_i$ according to a formula $V_{si}^b = m + Rh_i + Ug_b + \varepsilon_{si}^b$, $V_{si}^b$ representing a mean of an output result of the first neural network model for a voice feature vector of the $i^{th}$ piece of voice of the $s^{th}$ speaker, b representing a signal-to-noise ratio range corresponding to the target detecting voice, m representing a mean, R representing speaker information space, U representing signal-to-noise ratio space, $g_b$ representing a signal-to-noise ratio factor, and $\varepsilon_{si}^b$, representing a residual.

Optionally, the second training circuit 150 being configured to adjust a weight of the first neural network model by using the posterior mean as a second target output of the first neural network model, to obtain a voice identity feature extractor, by splicing voice feature vectors of a set quantity of frames adjacent to the target detecting voice as an input of the first neural network, and adjusting the weight of the neural network model by using the posterior mean of the I-vector latent variable as a second target output of the first neural network model and a mean square error between each output of the first neural network model and the second target output as a loss function, to obtain the voice identity feature extractor.

Optionally, the I-vector determining circuit 110 being configured to determine an I-vector corresponding to the training voice according to the voice feature vector of the training voice by determining, based on a GMM, an ample statistical amount according to voice feature vectors of respective frames of the training voice; and determining a total variability space matrix according to the ample statistical amount, and determining the I-vector corresponding to the training voice according to the total variability space matrix.

The voice identity feature extractor training apparatus described above may be loaded in an electronic device in a program form. FIG. 15 shows a hardware structure of an example electronic device. Referring to FIG. 15, the electronic device may include at least one processor 1, at least one communications interface 2, at least one memory 3, and at least one communications bus 4.

In this embodiment of this application, a quantity of each of the processor 1, the communications interface 2, the memory 3, and the communications bus 4, and the processor 1, the communications interface 2, and the memory 3 perform communication with each other through the communications bus 4.

Optionally, the processor 1 may be a Central Processing Unit (CPU) or an Application-Specific Integrated Circuit (ASIC) or may be configured as one or more integrated circuits.

The memory 3 may include a high-speed RAM memory, or may include a non-volatile memory (non-volatile memory), for example, at least one magnetic disk storage.

The memory stores an executable program, the program may be invoked and executed by the processor. The program may be configured to extract a voice feature vector of training voice. The program may be further configured to determine an I-vector corresponding to the training voice according to the voice feature vector of the training voice. The program may be further configured to adjust a weight of a neural network model by using the I-vector as a first target output of the neural network model, to obtain a first neural network model. The program may be further configured to obtain a voice feature vector of target detecting voice and determine an output result of the first neural network model for the voice feature vector of the target detecting voice. The program may be further configured to determine an I-vector latent variable according to the output result. The program may be further configured to estimate a posterior mean of the I-vector latent variable, and adjust a weight of the first neural network model by using the posterior mean as a second target output of the first neural network model, to obtain a voice identity feature extractor.

Optionally, for function subdivision and expended functions of the program, refer to corresponding descriptions above, for example, refer to descriptions on the voice identity feature extractor training method.

The classifier training apparatus described below may be considered as a program circuit that may be set by an electronic device (a form of the electronic device may be, for example, a server or a terminal) for implementing the classifier training method. The classifier training apparatus described below and the classifier training method described above may correspond and refer to each other.

FIG. 16 is a structural block diagram of an example classifier training method. Referring to FIG. 16, the classifier training apparatus may include a target detecting voice obtaining circuit 200, configured to obtain target detecting voice of a target speaker. The classifier training apparatus may further include a voice-feature-vector second extraction circuit 210, configured to extract a voice feature vector of the target detecting voice. The classifier training apparatus may further include a voice identity feature extraction circuit 220, configured to invoke a pre-trained voice identity feature extractor to input the voice feature vector of the target detecting voice into a voice identity feature extractor, to obtain a corresponding voice identity feature, the voice identity feature extractor being obtained by training an I-vector latent variable as a target output. The classifier training apparatus may further include a training circuit 230, configured to train a classifier according to the voice identity feature.

Optionally, the training circuit 230 being configured to train a classifier according to the voice identity feature by determining a mean of the voice identity feature; and performing intraclass covariance regularization and L2 norm regularization on the mean of the voice identity feature, to obtain a processed feature, and training the classifier by using the processed feature.

Optionally, in various implementations, the classifier may be based on a PLDA model, and correspondingly, the classifier may be a PLDA classifier. To increase precision of the classifier, an intraclass variation matrix in a scoring function of the PLDA classifier may be replaced with an intraclass co-variance matrix, and an interclass variation matrix may be replaced with a non-parameter interclass co-variance matrix.

Optionally, the classifier training apparatus may be loaded in an electronic device in a form of a program. A structure of the electronic device may, referring to FIG. 15, include: at least one memory, the memory storing an executable program. The program may be used to obtain target detecting voice of a target speaker. The program may be further used to extract a voice feature vector of the target detecting voice. The program may be further used to invoke a pre-trained voice identity feature extractor to input the voice feature vector of the target detecting voice into a voice identity feature extractor, to obtain a corresponding voice identity feature, the voice identity feature extractor being obtained by training an I-vector latent variable as a target output. The program may be further used to train a classifier according to the voice identity feature.

In various implementations, training of a novel voice identity feature extractor may be implemented The extraction of a novel voice identity feature with high reliability may be implemented by using the voice identity feature extractor obtained by training. Further, classifier training with higher precision may be implemented based on the novel voice identity feature, and the accuracy of speaker identity recognition may be improved based on the classifier obtained by training.

A storage medium, which may be non-transitory or other than a transitory signal, may be configured to store executable instructions. Running the executable instructions on a computer may cause the computer to perform the voice identity feature extractor training method or the classifier training method provided.

A computer program product, which may be non-transitory or other than a transitory signal, may include instructions, Running the instructions on a computer may cause the computer to perform the foregoing voice identity feature extractor training method or the foregoing classifier training method.

A person skilled in the art may further realize that, in combination with the embodiments herein, units and algorithm, steps of each example described can be implemented with electronic hardware, computer software, or the combination thereof. To describe the the hardware and the software, compositions and steps of each example have been generally described according to functions in the foregoing descriptions. Whether the functions are performed by hardware or software (that specifically configures the hardware on which it runs) depends on particular applications and design constraint conditions of the technical solutions. A person skilled in the art may use different methods to implement the described functions for each particular application, but it should not be considered that the implementation goes beyond this disclosure.

In combination with the embodiments herein, steps of the method or algorithm described may be directly implemented using hardware, software or the combination thereof (e.g., on a circuit). The software may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

Various modifications to the embodiments are obvious to the person skilled in the art, and general principles defined in this specification may be implemented in other embodiments without departing from the disclosure.

What is claimed is:

1. A voice identity feature extractor training method, applied to an electronic device and comprising:
   extracting a voice feature vector of training voice;
   determining an Identity-vector (I-vector) corresponding to the training voice according to the voice feature vector of the training voice;
   adjusting a weight of a neural network model by using the I-vector as a first target output of the neural network model, to obtain a first neural network model;
   obtaining a voice feature vector of target detecting voice and determining an output result of the first neural network model for the voice feature vector of the target detecting voice;
   determining an I-vector latent variable according to the output result; and
   estimating a posterior mean of the I-vector latent variable, and adjusting a weight of the first neural network model to render a training output of the first neural network model approaching the posterior mean as a second target output of the first neural network model, to obtain a voice identity feature extractor.

2. The voice identity feature extractor training method according to claim 1, wherein the adjusting a weight of a neural network model by using the I-vector as a first target output of the neural network model, to obtain a first neural network model comprises:
   determining an input voice feature vector according to the feature vector of the training voice; and
   adjusting the weight of the neural network model by using the input voice feature vector as an input of the neural network model, the I-vector as the first target output of the neural network model, and a mean square error between each output of the neural network model and the first target output as a loss function, to obtain the first neural network model.

3. The voice identity feature extractor training method according to claim 2, wherein the determining an input voice feature vector according to the feature vector of the training voice comprises:
   splicing voice feature vectors of a set quantity of frames adjacent to the training voice, to obtain the input voice feature vector.

4. The voice identity feature extractor training method according claim 1, wherein before the adjusting a weight of a neural network model, the method further comprises:
   initializing the neural network model by using a layer initialization method.

5. The voice identity feature extractor training method according to claim 1, wherein the determining an I-vector latent variable according to the output result comprises:
   determining a mean of the output result, training a signal-to-noise ratio-invariant probability linear discriminant analysis (SNR-invariant PLDA) model by using the mean, and calculating the I-vector latent variable in a training process.

6. The voice identity feature extractor training method according to claim 5, wherein the calculating the I-vector latent variable in a training process comprises:
   calculating an I-vector latent variable $h_i$ according to a formula $V_{si}^b = m + Rh_i + Ug_b + \varepsilon_{si}^b$,
   $V_{si}^b$ representing a mean of an output result of the first neural network model for a voice feature vector of the $i^{th}$ piece of voice of the $s^{th}$ speaker, b representing a signal-to-noise ratio range corresponding to the target detecting voice, m representing a mean of output results of voice feature vectors of all pieces of target detecting voice, R representing speaker information space, U representing signal-to-noise ratio space, $g_b$ representing a signal-to-noise ratio factor, and $\varepsilon_{si}^b$ representing a residual.

7. The voice identity feature extractor training method according to claim 1, wherein the adjusting a weight of the first neural network model by using the posterior mean as a second target output of the first neural network model, to obtain a voice identity feature extractor, comprises:
   splicing voice feature vectors of a set quantity of frames adjacent to the target detecting voice as an input of the first neural network, and adjusting the weight of the neural network model by using the posterior mean of the I-vector latent variable as a second target output of the first neural network model and a mean square error between each output of the first neural network model and the second target output as a loss function, to obtain the voice identity feature extractor.

8. The voice identity feature extractor training method according to claim 1, wherein the determining an I-vector corresponding to the training voice according to the voice feature vector of the training voice comprises:
determining, based on a Gaussian Mixture Model (GMM), an ample statistical amount according to voice feature vectors of respective frames of the training voice;
determining a total variability space matrix according to the ample statistical amount; and
determining the I-vector corresponding to the training voice according to the total variability space matrix.

9. A voice identity feature extractor training apparatus, comprising:
a voice-feature-vector first extraction circuit, configured to extract a voice feature vector of training voice;
an Identity-vector (I-vector) determining circuit, configured to determine an I-vector corresponding to the training voice according to the voice feature vector of the training voice;
a first training circuit, configured to adjust a weight of a neural network model by using the I-vector as a first target output of the neural network model, to obtain a first neural network model;
a first result determining circuit, configured to obtain a voice feature vector of target detecting voice and determine an output result of the first neural network model for the voice feature vector of the target detecting voice;
a latent variable determining circuit, configured to determine an I-vector latent variable according to the output result; and
a second training circuit, configured to estimate a posterior mean of the I-vector latent variable, and adjust a weight of the first neural network model to render a training output of the first neural network model approaching the posterior mean as a second target output of the first neural network model, to obtain a voice identity feature extractor.

10. The voice identity feature extractor training apparatus according to claim 9, wherein the second training circuit is configured to adjust a weight of a neural network model by:
determining an input voice feature vector according to the feature vector of the training voice; and
adjusting the weight of the neural network model by using the input voice feature vector as an input of the neural network model, the I-vector as the first target output of the neural network model, and a mean square error between each output of the neural network model and the first target output as a loss function, to obtain the first neural network model.

11. The voice identity feature extractor training apparatus according to claim 10, wherein the second training circuit is configured to determine an input voice feature vector according to the feature vector of the training voice by:
splicing voice feature vectors of a set quantity of frames adjacent to the training voice, to obtain the input voice feature vector.

12. The voice identity feature extractor training apparatus according claim 9, wherein before the adjusting a weight of the neural network model, the second training circuit is configured to:
initialize the neural network model by using a layer initialization method.

13. The voice identity feature extractor training apparatus according to claim 9, wherein the latent variable determining circuit is configured to determine the I-vector latent variable according to the output result by:
determining a mean of the output result, training a signal-to-noise ratio-invariant probability linear discriminant analysis (SNR-invariant PLDA) model by using the mean, and calculating the I-vector latent variable in a training process.

14. The voice identity feature extractor training apparatus according to claim 13, wherein the latent variable determining circuit is configured to calculate the I-vector latent variable in the training process by:
calculating an I-vector latent variable $h_i$ according to a formula $V_{si}^b = m + Rh_i + Ug_b + \varepsilon_{si}^b$,
$V_{si}^b$ representing a mean of an output result of the first neural network model for a voice feature vector of the $i^{th}$ piece of voice of the $s^{th}$ speaker, b representing a signal-to-noise ratio range corresponding to the target detecting voice, m representing a mean of output results of voice feature vectors of all pieces of target detecting voice, R representing speaker information space, U representing signal-to-noise ratio space, $g_b$ representing a signal-to-noise ratio factor, and $\varepsilon_{si}^b$ representing a residual.

15. The voice identity feature extractor training apparatus according to claim 9, wherein the second training circuit is configured to adjust a weight of the first neural network model by:
splicing voice feature vectors of a set quantity of frames adjacent to the target detecting voice as an input of the first neural network, and adjusting the weight of the neural network model by using the posterior mean of the I-vector latent variable as a second target output of the first neural network model and a mean square error between each output of the first neural network model and the second target output as a loss function, to obtain the voice identity feature extractor.

16. The voice identity feature extractor training apparatus according to claim 9, wherein the I-vector determining circuit is configured to determine the I-vector corresponding to the training voice by:
determining, based on a Gaussian Mixture Model (GMM), an ample statistical amount according to voice feature vectors of respective frames of the training voice;
determining a total variability space matrix according to the ample statistical amount; and
determining the I-vector corresponding to the training voice according to the total variability space matrix.

* * * * *